Sept. 1, 1959
J. W. WHITE
2,902,083
METHOD OF MANUFACTURING TIRE BEADS
Filed March 3, 1955
3 Sheets-Sheet 1
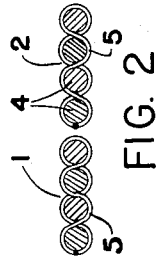
FIG. 2
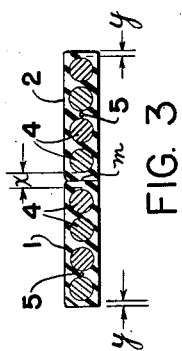
FIG. 3
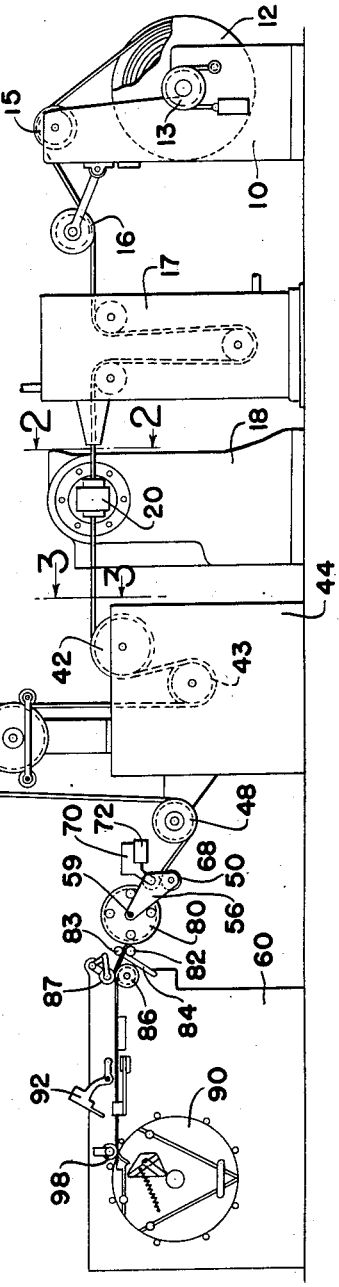
FIG. 1
FIG. 4
INVENTOR.
JOHN W. WHITE
BY
ATTORNEYS Sept. 1, 1959          J. W. WHITE          2,902,083
METHOD OF MANUFACTURING TIRE BEADS
Filed March 3, 1955          3 Sheets-Sheet 2
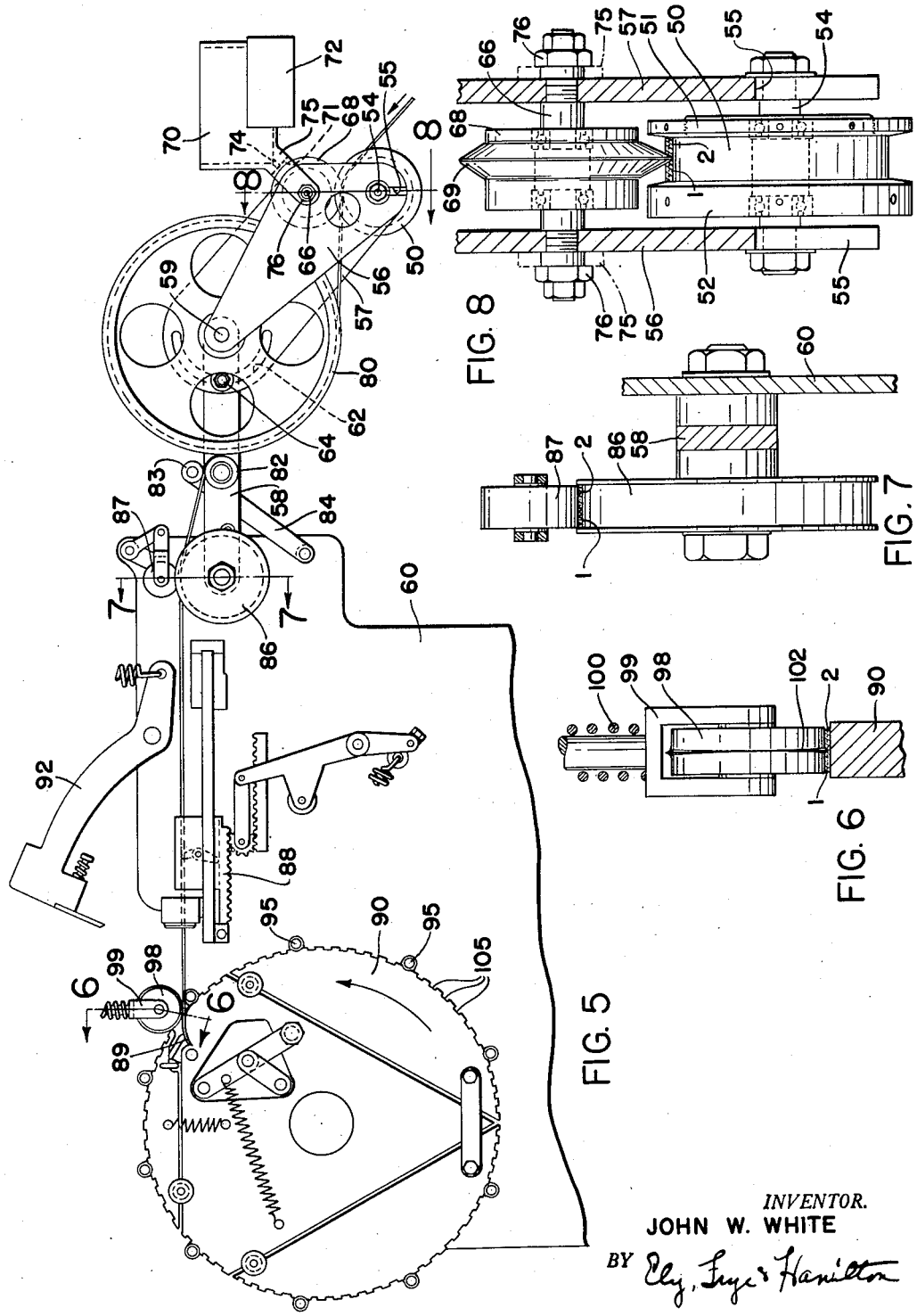
INVENTOR.
JOHN W. WHITE
BY *Ely, Frye & Hamilton*
ATTORNEYS Sept. 1, 1959 J. W. WHITE 2,902,083
METHOD OF MANUFACTURING TIRE BEADS
Filed March 3, 1955 3 Sheets-Sheet 3
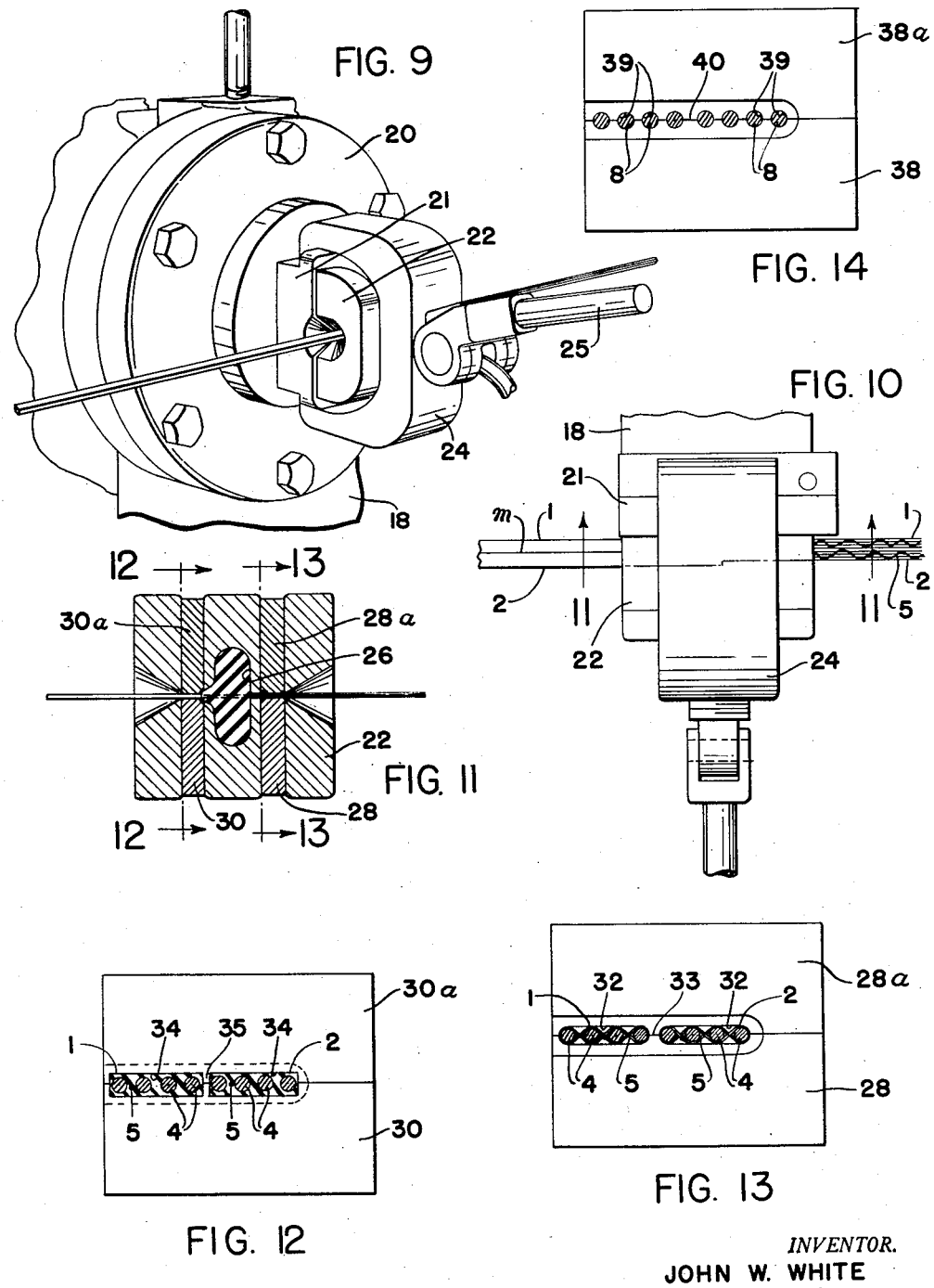
INVENTOR.
JOHN W. WHITE
BY
ATTORNEYS

United States Patent Office 2,902,083
Patented Sept. 1, 1959

2,902,083

METHOD OF MANUFACTURING TIRE BEADS

John W. White, Wadsworth, Ohio, assignor to National-Standard Company, Niles, Mich., a corporation of Delaware Application March 3, 1955, Serial No. 491,813

7 Claims. (Cl. 154—14)

The present invention relates to a new and improved method of manufacturing tire beads which are later incorporated in the bead portions of pneumatic tires. Tire beads to which the present invention relates are composed of a wire reinforcement which may be a plurality of wires woven into a flat braid, a series of parallel wires held together by a light wire woven through the parallel wires known in the art as "Pierce Tape," or a plurality of separate wires which are held together solely by the rubber coating or insulation. The last named type of bead is known as a "weftless bead." While the invention is applicable to all three types of beads, it will be shown and described as applied to the manufacture of beads from "Pierce Tape."

In accordance with the usual procedure, the tape or individual wires, the surfaces of which are treated so that rubber will adhere thereto, are supplied on large drums or creels and the bead wires or tape are led through a heating chamber and thence through a die, at which point rubber is forced into and around the wire which issues therefrom as a flat tape coated with rubber in which the wires are thoroughly embedded and encased.

From the die, the rubber coated wire tape is led through a cooling device, a storage festoon, and then to the bead-making machine. Machines of this type are old and well known. A typical machine of the type generally referred to in the trade as FSW machines is shown in the Shook Patent No. 2,190,805. These machines are largely automatic and comprise a rotating drum about which the wire is wrapped in a plurality of convolutions, dependent upon the thickness and strength of the bead desired. Three or four turns around the bead building drum, with an overlap of 6 inches or less, is general practice. The machine is equipped with means for automatically introducing the leading end of the bead tape into a gripper on the bead drum, intermittently operated means for rotating the drum the number of turns to make the requisite laps about the drum, and a knife to sever the oncoming tape at the end of each building cycle.

During the pause in the rotation of the bead building drum, after each cycle is completed, the grommet is ejected laterally from the building drum and is delivered to a rack. There is always a short length of tape on the inside of the bead where the tape was gripped, and another length of tape on the outside of the bead due to the spacing of the knife from the drum. After the completed bead ring has been removed from the rack, the loose ends of the wire are fastened to the body of the bead by either applying a friction tape around the ends of the wire tape or by stapling the ends on a standard stapling machine.

The foregoing is a brief statement of the operation of making beads from rubber-coated wire tape. The operation of winding a single bead about the drum is carried on automatically and is very rapid.

The present invention has as its object a method manufacturing tire beads whereby the production of a standard installation for building tire beads will be doubled. Doubling the output of a standard installation makes it possible to use less time and equipment to provide the requirements for beads in the factory.

In the drawings is shown a typical installation operating on the method forming the subject matter of the present invention, it being understood that changes and modifications may be made in the equipment without departing from the essentials of the invention as set forth in the appended claims.

In the drawings:

Fig. 1 is a side elevation of a complete installation for the manufacture of multiple tire beads during a single cycle of the bead building machine.

Fig. 2 is a cross section on the line 2—2 of Fig. 1 through the bare wire tape which forms the reinforcement. As shown, the wires are parallel and are arranged in two groups of four each, held together in tape form by a light wire woven through the main wires.

Fig. 3 is a section on the line 3—3 of Fig. 1 showing the dual wire tape after it issues from the insulating die.

Fig. 4 is a view looking at the dual bead.

Fig. 5 is a side view of the bead building machine.

Figs. 6, 7 and 8 are detailed sections on the lines 6—6, 7—7 and 8—8 of Fig. 5.

Fig. 9 is an enlarged perspective view of the die which forces the rubber insulation around the wire.

Fig. 10 is a view looking down on the die.

Fig. 11 is a section on the line 11—11 of Fig. 10.

Figs. 12 and 13 are sections on the lines 12—12 and 13—13 of Fig. 11.

Fig. 14 is a view of the modified baffle plate which is used when weftless tape is to be processed.

In the embodiment of the invention which has been selected for the purposes of explaining the invention, there are shown two separate "Pierce" tapes 1 and 2, each consisting of four parallel wires 4 held in tape form by a light filling wire 5 which is woven back and forth across the wires 4.

In case the unwoven or weftless form of reinforcement is to be employed, as shown in Fig. 14, the individual wires 8 have nothing to hold them together except the rubber casing which is formed about them at the insulating die.

The braided type of reinforcement is not shown, although it may be processed in the same manner as the "Pierce Tape."

In Fig. 1, in which the complete installation is shown, there is shown a stand 10 on which is mounted the spool 12 which supplies one of the tapes to be converted into a bead. The rotation of the spool 12 is retarded by a brake 13 and the tape is led over an idler 15 and under a floating guide roller 16. It will be understood that two of these stands and spools are provided for both the "Pierce" tape and the braided tape, and these two stands are arranged side-by-side so that only one shows in Fig. 1.

In processing the weftless form of tape, the individual wires will be led from individual spools, equal in number to the wires which are to be processed. In case two four-wire tapes of the weftless type are to be treated, eight supply spools will be required. The spools and stands therefor would preferably be arranged fan-wise so that the several wires converge toward the insulating die.

From the stands 10, the tapes are conducted to a preheater 17, in which the tapes are heated by any suitable means, such as by a gas flame, by steam, or electrically, and by which the wires are brought to a temperature to receive the rubber insulation.

From the preheater, the tapes pass directly to the tubing machine 18 where the rubber insulation is forced into the tape and around the wires. The tubing machine is of any standard make, is heated to plasticize the rubber, and is provided with a die head, indicated as a whole at 20, and with a screw to force the plastic rubber into the die and around the tapes.

The die head is composed of two sections 21 and 22, section 21 being secured to the discharge end of the tubing machine and section 22 being held against the section 21 by a U-shaped clamp 24 having hooked ends which engage flanges on the section 21. A swinging clamp screw handle 25 forces the two sections of the die together.

The two sections of the die head are provided with parallel slots on either side of the die chamber 26. In one slot are located baffle plates 28 and 28a, through which the wire tapes enter the die, and in the other slot are the die plates 30 and 30a, through which the tapes emerge with the rubber coating which has been forced into and around the wires during their passage through the chamber 26.

Referring to Fig. 13, the lower baffle plate 28 and the upper baffle plate 28a meet at the center line of the wire tapes where they are provided with two elongated, aligned slots 32, through which the individual tapes pass, it being noted that the slots 32 are spaced apart as at 33 by a distance equal to at least twice the space between individual wires of each tape, so that the edges of the two tapes are spaced apart as shown in Fig. 2.

In like manner, the die plates 30 and 30a meet at the center line of the wire tapes where they are provided with slots 34, one for each tape. The slots 34 are of sufficient width and are spaced apart as at 35 so that sufficient rubber will flow around and enclose the adjacent edges of the tape to provide a double thickness of rubber where the edges of the two tapes are in opposition.

While the two tapes are spaced apart at the die by the web 35, the rubber on the tapes will flow together as the tapes leave the die, so that two tapes will come together and adhere in edge-to-edge contact to form a relatively wide ribbon which may also be termed a dual tape. This condition is shown in Fig. 3, attention being called to the fact that in this view the thickness of rubber at the point $x$ between the two tapes is twice the thickness of rubber at the points $y$ at the outer edges of the ribbon and between the individual wires of a single tape.

By arranging baffle plates and the die plates as described, it is assured that there will be sufficient rubber between the adjacent edges of the tapes so that when the dual bead or ribbon made from the dual tapes is divided there will be ample insulation on both edges of each bead.

The arrangement of the baffle plates for the dual weftless beads is shown in Fig. 14. In this case, the two sections 38 and 38a of the baffle plate meet along the center line of the wires 8 where the edges of the sections are provided with holes 39 to receive the individual wires. As shown, the holes are arranged in two groups of four, divided by a web 40 which is approximately twice as wide as the spacing between the individual wires of each group. This gives the added thickness of rubber between the units of the dual bead.

From the die head 20, the two beads pass over two driven rolls 42 and 43 which propel the tapes through the die. The roll 43 is preferably enclosed in a cooling unit 44, in addition to which the rolls themselves may be chilled. From the cooling unit the tape is led into a storage and supply festoon, indicated generally by the numeral 46, in which an ample supply of ribbon is kept from which the bead making machine will draw. The amount of ribbon in the festoon controls, in a well known manner, the operation of the rolls 42 and 43 so that an adequate supply is always present in the festoon.

At the lower end of the festooning unit is a guide roll 48 over which the dual rubberized tape is led.

When the dual rubberized tape leaves the die head, the edges of the individual tapes will adhere to one another due to the adhesive character of the rubber, and this tendency to adhere in the form of a ribbon will be increased during the passage through the cooling device and through the festooning apparatus. While the adhesion may not be sufficiently strong to interfere with a clean separation of the two beads, it may be advisable to make certain that the adhesion is weak enough so that when the two beads are subsequently separated there will be a clean break along the line of division shown at $m$ in Figs. 3 and 4.

To insure a clean line of cleavage, the dual tape or ribbon is first led over a guide roll 50 having adjustable flanges 51 and 52, to accommodate different widths of ribbon. The roll 50 is rotatable on a shaft 54, adjustably mounted in slots 55 on the lower sides of two parallel arms 56 and 57 (Fig. 8). The arm 56 is triangular in shape, as shown in Fig. 5, and is pivoted at its upper end on the shaft 59 on the end of a link 58 which is fixed to and projects rearwardly from the frame 60 of the bead making machine. The arm 57 is also pivotally mounted on the end of the link 58 but it is provided with an arc-shaped slot 62 so that by the bolt 64 the angular position of the arms 56 and 57 may be adjusted for a purpose to be described.

Located above the shaft 54 in the two arms 56 and 57 is a second shaft 66 on which is rotatable a pinch roll 68 having an angular rib 69 which bears against the surface of the roll 50 and serves as a pinch roll which passes between the two sections of the ribbon. By passing into and through the dual tape, as shown in Fig. 8, the roll 68 subdivides the tape into two sections along a line upon which the dual bead will be separated after the tire beads are completed. While the two tapes will tend to stick together during the subsequent operations the temporary separation by the roll 68 before the grommet is formed will create a line of cleavage, the presence of which will cause the two beads to separate cleanly. If desired, another purpose for which the roll 68 may be used is to apply a substance to the adjacent edges of the tapes which will prevent a degree of adhesion between the tapes which will interfere with their subsequent separation. It will be understood that the pressure and tension exerted upon the tape during the subsequent bead forming operations will tend to cause the two sections of the dual tape to adhere so firmly that a clean break may not be possible.

For the above purpose there is located, above the roll 68, a reservoir 70 for a material which will reduce the tackiness of the rubber when applied thereto. In the form shown, this reservoir is adapted to hold paraffin which is kept in a liquid state by a heater unit 72. The liquid paraffin will flow out of a hole 74 in the base of the reservoir and onto a pad 71 or the like which rests on the surface of the roll 68 and applies a light coating of paraffin to the roll, which is then carried to the edges of the two parallel tapes. The reservoir is carried on arms 75 held by nuts 76 on the ends of the shaft 66.

The reasons for mounting the arms 56 and 57 so that they have a wide range of arcuate adjustment about the axis of the shaft 59 are twofold. In the first place, it may be desirable to use the bead making unit for making single beads, in which case the whole assembly may be swung upwardly out of the path of the tape and clamped in that position. The second reason is based upon the necessity of running the pinch roll 68 along the exact center line of the ribbon so that the rubber stock will be equally divided between the two beads. The ribbon is guided by the flanges 51 and 52 but it is essential to have a sufficient arcuate area of contact between the ribbon and the roll 50 so that the ribbon will not shift to one side or the other during its passage over the roll 50. By raising or lowering the roll 50 through the adjustment of the arm 57, the extent of wrap-around of the ribbon about the roll 50 may be varied and in this way any tendency of the ribbon to shift on the roll 50 will be overcome.

From the roll 80, the ribbon is led over a roll 82 of relatively small diameter, against which it is held by the idler roll 83, mounted on the end of a swinging link 84 pivoted on the frame of the bead-building machine. The purpose of the roll 82 is to place a sharp bend in the tapes so that the end of each tape, after severance, will tend to cling to the circumference of the bead.

From the roll 82 the ribbon is led over a flanged guide roll 86 and under roller 87 on the bead-forming machine frame, and thence through the feeding unit 88 which advances the end of the ribbon at the commencement of a bead-winding operating into the jaw 89 on the bead-forming drum 90. The ribbon is severed after the requisite number of turns by the knife 92, and after each multiple bead is formed it is ejected from the drum by ejector fingers 95 located about the periphery of the drum. To press the tapes against the drum, a roller 98 is mounted in a fork 99 at the face of the drum, a coil spring 100 pressing the roller against the tape. The face of the roller is provided with a rib 102 which indents each convolution of the tape between the two sections thereof, following the line impressed on the tape by the pinch roll 68. This makes easier the subsequent separation of the finished grommet into the two beads.

The operation of the bead-forming machine is the same as the well-known FSW machines which have been in use for many years, a typical machine being shown in the aforesaid Shook Patent No. 2,190,805 or Shook Patent No. 2,151,306.

There is a modification, however, in the face of the drum 90 which is required for the manufacture of the wider grommet. As the ribbon is wrapped around the drum under considerable tension it will cling closely to the surface of the drum, and while the close fit of the circular grommet on the circular drum presents no problem for the ejection of single beads, the dual bead is much broader and will tend to bind upon a smooth surfaced drum. Because of this possibility of binding, the surface of the drum is relieved by the grooves 105 so that the tendency to bind is practically eliminated.

The dual bead or grommet as it is ejected from the drum 90 is in the form shown in Fig. 4. The two individual beads are stuck together along the line m but the adhesion is frangible and may be broken without removing any of the rubber covering from the face of either bead. For this purpose, it may be desirable to treat the dual tape to the pinching operation at the rolls 50 and 68, and also at 98, and to apply an agent such as the paraffin coating to the line of cleavage between the beads at the rolls 50 and 68. Other agents to reduce the tacky properties of the warm, uncured rubber may be used, such for example as a slurry of soapstone or other dusting powder, or a light coating of silicone, or a light wax.

The grommet will be separated into the two sections and the ends of the wires attached to the body of each bead, whereupon it is ready for the covering operations which are required before the beads can be built into a tire.

By the process of this invention it is possible to obtain multiple beads from a single machine, and while it is desirable to make only two beads at one operation, it may be possible with the use of the invention to make even more beads at a time. Although four parallel wires have been shown as constituting the reinforcing elements, this number is not essential and may be changed, as is well known in the art.

What is claimed is:

1. The method of manufacturing tire beads comprising, passing a plurality of wires simultaneously through a chamber, forcing a rubber stock into and around the wires, said wires issuing from the chamber as a relatively wide ribbon, separating the ribbon temporarily into two parallel tapes, injecting a tack reducing agent in the line of separation, wrapping the ribbon in a plurality of convolutions to form a single grommet, and parting the grommet in a plurality of tire beads along the aforesaid line of separation.

2. The method of manufacturing tire beads comprising, passing at least two wire tapes simultaneously through a chamber, forcing a rubber stock into and around the tapes, said tapes issuing from the chamber as a relatively wide ribbon, separating the ribbon temporarily into two parallel tapes, injecting a tack reducing agent in the line of separation, wrapping the ribbon in a plurality of convolutions to form a single grommet, and parting the grommet in a plurality of tire beads along the aforesaid line of separation.

3. The method of manufacturing tire beads comprising, propelling at least two wire bead tapes in side-by-side relation, forcing rubber stock into and around said tapes while said tapes are in motion, applying a tack reducing agent to adjacent edges of the rubberized tapes, and wrapping said tapes in a plurality of convolutions to form at least two separable ring-shaped beads.

4. The method of manufacturing tire beads comprising, propelling a plurality of wire reinforcing elements in side-by-side relation and in sufficient number to form at least two tire beads, forcing rubber stock into and around all of said reinforcing elements while said elements are in motion to form a ribbon, dividing said ribbon into tapes, applying a tack reducing agent to adjacent edges of the tapes, and wrapping said tapes simultaneously into a plurality of convolutions to form at least two separable ring-shaped beads.

5. The method of manufacturing tire beads comprising, propelling a plurality of wire bead tapes in side-by-side relation and in sufficient number to form at least two tire beads, forcing rubber stock into and around all of said tapes while said tapes are in motion to form a ribbon, dividing said ribbon into tapes, applying a tack reducing agent to adjacent edges of the tapes, and wrapping said tapes simultaneously into a plurality of convolutions to form at least two separable ring-shaped beads.

6. The method of manufacturing tire beads comprising passing a plurality of reinforcing elements simultaneously through a chamber, separating the elements into groups, the spacing between the groups being greater than the spacing between the elements of each group, forcing a rubber stock into and around all of the elements to form a single rubber covered ribbon in which the width of the rubber between the groups is at least twice as great as the thickness of rubber at an edge of the ribbon, dividing the ribbon into two separate ribbons on a dividing line substantially midway of the space between the ribbons, wrapping the dual ribbons simultaneously about a bead forming drum in a plurality of convolutions to form a single grommet and thereafter subdividing the unvulcanized grommet along the aforesaid dividing line.

7. The method of manufacturing tire beads comprising passing at least two wire tapes simultaneously through a chamber, spacing the wire tapes laterally while in the chamber, forcing a rubber stock into and around the tapes and into the space between the tapes to form a single, unvulcanized rubber-covered ribbon, the body of rubber between the tapes being at least twice as wide as the width of rubber at the edge of the ribbon, subdividing the ribbons into two separate ribbons along a line substantially midway of the space between the tapes, wrapping the dual ribbons simultaneously about a bead forming drum in a plurality of convolutions to form a grommet and thereafter subdividing the unvulcanized grommet along the aforesaid dividing line.

References Cited in the file of this patent

UNITED STATES PATENTS

| | | |
|---|---|---|
| 1,661,069 | Hartung | Feb. 28, 1928 |
| 1,913,336 | MacMonagle | June 6, 1933 |
| 1,923,699 | Andrews | Aug. 22, 1933 |
| 1,963,813 | Voorhis | June 19, 1934 |
| 2,089,774 | Wachstein | Aug. 10, 1937 |
| 2,149,079 | White et al. | Feb. 28, 1939 |
| 2,204,782 | Wermine | June 18, 1940 |

FOREIGN PATENTS

| | | |
|---|---|---|
| 470,448 | Great Britain | Aug. 13, 1937 |